April 30, 1968  S. ZISLER ETAL  3,381,297
WIDE-BAND GONIOMETER SYSTEM
Filed Feb. 7, 1966  2 Sheets-Sheet 2

United States Patent Office 3,381,297
Patented Apr. 30, 1968

3,381,297
WIDE-BAND GONIOMETER SYSTEM
Siegfried Zisler and Gerard Dubost, Paris, France, assignors to CSF—Compagnie Generale de Telegraphie Sans Fil, a corporation of France
Filed Feb. 7, 1966, Ser. No. 525,507
Claims priority, application France, Feb. 11, 1965, 5,128
6 Claims. (Cl. 343—113)

ABSTRACT OF THE DISCLOSURE

A wide-band goniometer system for determining the angular position of a radiating source comprising: an antenna which comprises four elements wound in equiangular spirals on a cone of revolution; an hybrid junction, which receives on its two inputs input voltages respectively equal to the difference between the voltages induced by the radiating source in two elements disposed at right angle and to the difference between the voltage induced in the two other elements, and which provides, on its two outputs, resultant voltages respectively equal to the sum and the difference of these input voltages; and phase measuring means for measuring the phase-shift between these resultant voltages.

The present invention relates to wide-band goniometers.

A known instantaneous wide-band goniometer system comprises a plurality of receiver channels equipped with directional antennae arranged in fan-shape so as to cover a wide portion of space. A short duration radio-electric emission gives rise in the receivers to signals with different amplitudes, which serve to determine the azimuth of the emission source. The accurate angular localization depends substantially on the identity of the respective directional diagrams of the antennae over the whole frequency range. This condition is difficult to fulfill in practice, taking into account the angular accuracy to be obtained and the width of the required band.

It is an object of this invention to provide a wide-band goniometer free of this drawback.

According to the invention there is provided an instantaneous wide-band goniometer system for determining the angular position of a radiating source comprising: an antenna comprising a plurality of elements wound in equiangular spirals bounding a volume of revolution; mixing means connected to said elements for algebraically summing the voltages respectively induced by said source in said elements to provide two different resultant voltages, said means having two outputs; and phase measuring means, coupled to said outputs, for measuring the phase-shift between said resultant voltages.

For a better understanding of the invention and to show how the same may be carried into effect, reference will be made to the drawing accompanying the following description and in which.

The antenna of the goniometer system according to the invention essentially consists of a plurality of equiangular spirals A to D, wound about an insulating body of revolution 1. By equiangular spirals are meant spirals all of which intersect the generatrices of the surface 1 with the same angle. However, body 1 is not necessary if the spirals are sufficiently rigid to be self-supporting.

Figure 1:
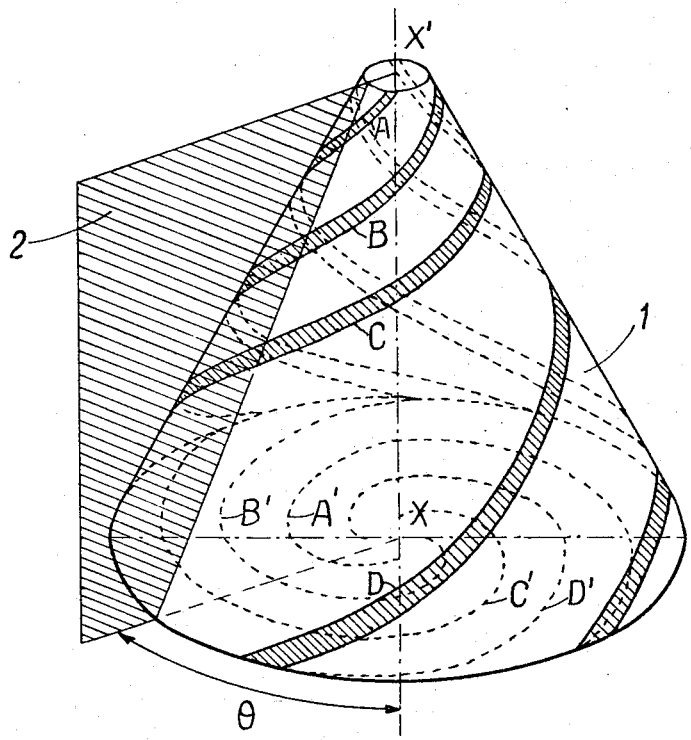
FIG. 1 is a view in perspective of an antenna according to the invention.

One embodiment of such an antenna is shown by way of example in FIG. 1, the supporting surface being that of a cone. The angular distribution of the conductors A, B, C and D relative to the axis of revolution XX' of cone 1 is such that, by rotating a spiral, it may be made to coincide with another spiral. This regular angular distribution can be better visualized from the projections of the conductors A, B, C, D on to the base of the cone. The equiangular spirals A', B', C', D', shown in dotted lines, represent these projections. The shape of the body 1 carrying the conductors may be not only conical but more generally any quadric surface of revolution.

If a plane 2, passing through the axis XX' and forming an azimuthal angle $\theta$ with a given reference direction of the antenna, is considered, a radio-electric source, located in the plane 2, will induce in the conductors A, B, C, D voltages, the phases of which will depend on the phase of the source, the transmission distance, the orientation of each conductor and, of course, the azimuthal angle $\theta$. It should also be noted that in spiral antennae, when the phase of an induced voltage varies by $\Delta\varphi$ due to a rotation of the source by $\Delta\theta$ about the axis XX', one obtains the very simple relation $\Delta\varphi = \Delta\theta$.

According to the invention the four conductors A, B, C, D of FIG. 1 are used to carry out the signal reception according to two different modes: the two reception modes differ by the manner of adding to each other the voltages respectively induced in each conductor, i.e. the manner in which they are coupled to each other.

Figure 2:
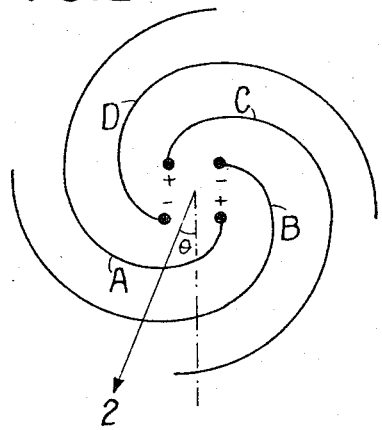
FIGS. 2 and 3 are explanatory diagrams.

FIG. 2 shows diagrammatically in plan view the first reception mode. The voltages induced in conductors A and C are marked "plus," which indicates that they are added at the input of the receiver. The voltages induced in the conductors B and D are marked "minus," since they are added after phase reversal. Thus, designating by $E_A$, $E_B$, $E_C$ and $E_D$ the voltages respectively induced in conductors A, B, C and D, the combination shown in FIG. 2 provides a resultant voltage equal to $E_A + E_C - E_B - E_D$. It may be shown that this algebraic sum of the induced voltages is a resultant voltage $V_A$, whose phase varies almost linearly by 720° for a complete revolution of the source about the antenna.

Figure 3:
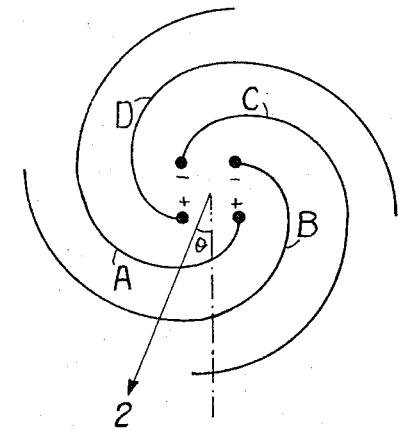

In addition to this alternate coupling, a coupling as shown in FIG. 3 is also provided. For this latter coupling the phase of the resultant voltage $V_G = E_A - E_B - E_C + E_D$ varies almost linearly by 360° for one complete revolution of the source about the antenna.

The phase difference between the resultant voltages $V_A$ and $V_G$ corresponding to the two coupling modes undergoes a substantially linear variation by 360° when the source makes one complete revolution about the antenna. The amplitudes of the resultant voltages are substantially identical, which makes it possible to measure the phase difference with a maximum precision. Thus, the azimuth, or more broadly the angular position, of an emission source can be determined according to the invention by the instantaneous measurement of the phase difference between the voltages simultaneously supplied by a coupling device which receives the voltages induced in the antenna conductors and applies them, suitably mixed, to the two inputs of a phasemeter.

Figure 4:
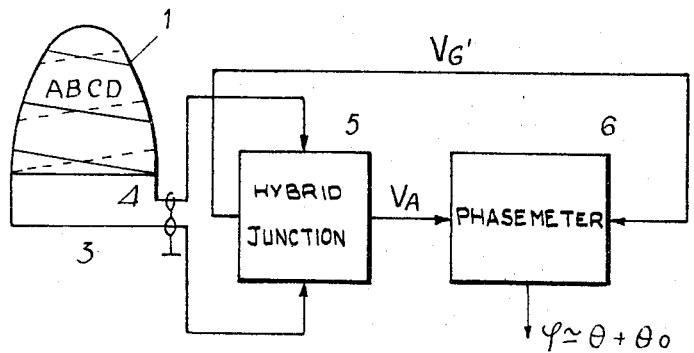
FIG. 4 is a circuit diagram of a system according to the invention.

FIG. 4 shows the electrical diagram of the goniometer system according to the invention. It comprises an antenna 1 carrying spiral conductors A, B, C and D. Two feeders 3 and 4 apply two composite voltages $E_C - E_D$ and $E_A - E_B$ to the inputs of a hybrid junction 5, whose outputs supply the decoupled voltages $V_A$ and $V_G$. These resultant voltages are then applied to the two inputs of a phasemeter 6, the measuring value $\varphi$ of which is substantially the azimuth $\theta$ to within a constant $\theta_0$. This constant $\theta_0$ can be eliminated by a preliminary orientation of the antenna, so that a direct reading of the azimuth $\theta$ is provided.

Figure 5:
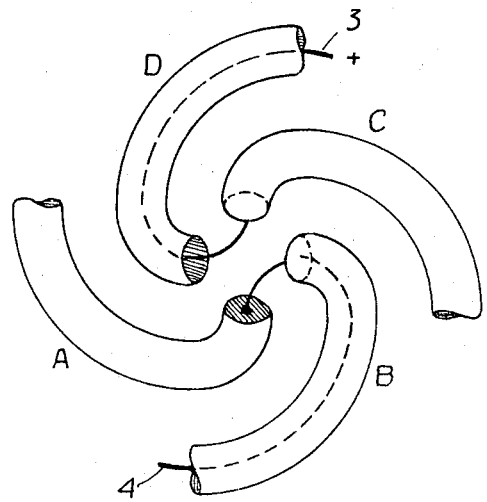
FIG. 5 is a diagram showing the connections of the receiving elements at the apex of the antenna.

Diagrammatically FIG. 5 shows the coupling between the four antenna conductors and the feeders 3 and 4 at the top of cone 1 in accordance with a feature of the invention. The conductors A, B, C and D are wound in equiangular spirals starting from the apex of the support 1. The conductors A and C are formed by hollow conductors respectively connected, at the apex of cone 1, to the inner conductor of two co-axial cables 3 and 4 whose outer conductors respectively form the conductors B and D of the antenna. The cables 3 and 4 extend beyond the base of the antenna and couple the latter to the directional coupler 5. Due to this connection mode, the conductors A and B supply the feeder 4 with opposite phases and the conductors C and D supply the feeder 3 with opposite phases.

Since the voltages supplied by the feeders have the same amplitudes, they may be applied to the inputs of a wide-band hybrid junction 5, whose outputs respectively provide the voltages $V_A$ and $V_G$, which voltages are then applied to a phasemeter which measures the phase difference therebetween.

Figure 6:
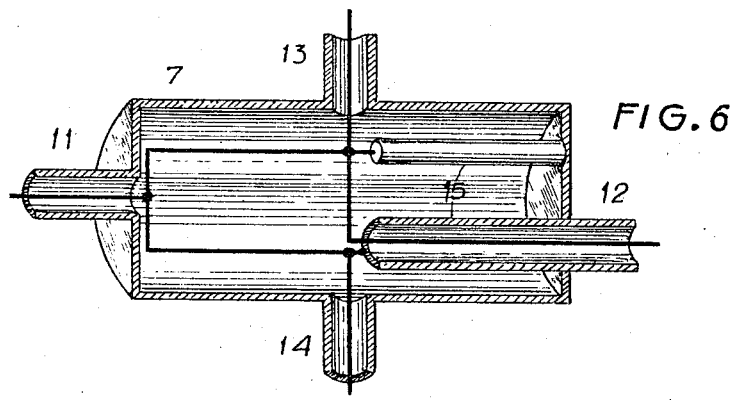
FIG. 6 is a perspective view in section of a hybrid junction according to the invention.

FIG. 6 shows, by way of example, a hybrid junction used according to the invention. It comprises a metal body 7 with two co-axial inputs 13 and 14, and two co-axial outputs 11 and 12. Inside the body there is shown at the left hand half a symmetrical T-junction which connects the output 11 with the inputs 13 and 14. This junction feeds to the output 11 the sum of the voltages applied to the inputs 13 and 14. The right hand half of the junction shows a symmetrical-unsymmetrical transformer "Balun" which transmits to the output 12 the difference of the voltages applied to the inputs 13 and 14. It must be understood that other types of hybrid junctions can be used for separating the voltages corresponding to the two receiving modes of the antenna without departing from the principle of the invention.

The goniometer system of the invention has the advantage of having a frequency independent, omnidirectional and compact antenna.

The angular measurement is reduced to a mere measurement of a phase difference which is rapid and accurate.

Of course the invention is not limited to the embodiments described and shown which have been given only by way of example.

What is claimed is:

1. An instantaneous wide-band goniometer system for determining the angular position of a radiating source comprising: an antenna comprising two pairs of elements, said elements being wound in equiangular spirals bounding a quadric of revolution, said elements of each pair being disposed at an angle of 90° with respect to each other and one pair of elements being disposed at an angle of 180° with respect to the other; means for connecting said elements of each pair to provide output voltages respectively equal to the difference between the voltages induced by said source in said elements of each pair; mixing means having two inputs for respectively receiving said output voltages and two outputs for providing two resultant voltages respectively equal to the sum and the difference of said output voltages; and phase measuring means, coupled to said outputs of said mixing means, for measuring the phase-shift between said resultant voltages.

2. A goniometer system according to claim 1, wherein said elements are self-supporting.

3. A goniometer system according to claim 1, wherein said elements are supported on an insulating body bounded by said quadric of revolution.

4. A goniometer system according to claim 3, wherein said body is a cone.

5. An instantaneous wide-band goniometer system for determining the angular position of a radiating source comprising: an antenna comprising a plurality of elements; said elements being wound in equiangular spirals bounding a volume of revolution; an hybrid junction having two inputs and two outputs and a pair of feeders coupling said inputs to said elements, said hybrid junction comprising a symmetrical T connecting one of said outputs to said inputs and a balanced-to-unbalanced transformer connecting said other output to said inputs, said two outputs delivering two different resultant voltages, respectively equal to algebraic sums of the voltages respectively induced by said source in said elements; and phase measuring means, coupled to said outputs, for measuring the phase-shift between said resultant voltages.

6. An instantaneous wide-band goniometer system for determining the angular position of a radiating source comprising: an antenna comprising four elements wound in equiangular spirals on a cone of revolution, two of said elements being two conductors wound on said cone symmetrically with respect to the axis of revolution of said cone, and the two other elements being the outer conductors of two coaxial feeders wound on said cone at the same distance from said conductors, the inner conductors of said feeders being respectively connected at the summit of said cone to said conductors; an hybrid junction having two inputs respectively connected to said feeders and two outputs for delivering two different resultant voltages, respectively equal to algebraic sums of the voltages respectively induced by said source in said elements; and phase measuring means, coupled to said outputs, for measuring the phase-shift between said resultant voltages.

References Cited

UNITED STATES PATENTS

| | | | |
|---|---|---|---|
| 2,958,081 | 10/1960 | Dyson | 343—895 |
| 2,990,548 | 6/1961 | Wheeler | 343—895 |
| 3,175,217 | 3/1965 | Kaiser et al. | 343—113 |
| 3,188,643 | 6/1965 | Dyson et al. | 343—895 |
| 3,229,293 | 1/1966 | Little et al. | 343—113 |

RICHARD A. FARLEY, *Primary Examiner.*

RODNEY D. BENNETT, *Examiner.*

R. E. BERGER, *Assistant Examiner.*